United States Patent [19]

Bodo et al.

[11] Patent Number: 5,680,555
[45] Date of Patent: Oct. 21, 1997

[54] HOST ADAPTER PROVIDING AUTOMATIC TERMINATOR CONFIGURATION

[75] Inventors: Martin J. Bodo, Mountain View; Robert A. Rosenbloom, Brookdale, both of Calif.

[73] Assignee: Computer Performance Inc., Sunnyvale, Calif.

[21] Appl. No.: 507,789

[22] Filed: Jul. 26, 1995

[51] Int. Cl.$^6$ .............................. H01R 9/07; G06F 13/40
[52] U.S. Cl. ......................... 395/306; 395/281; 395/822
[58] Field of Search ................................. 395/280, 281, 395/282, 283, 284, 822, 828

[56] References Cited

U.S. PATENT DOCUMENTS

| | | | |
|---|---|---|---|
| 4,220,876 | 9/1980 | Ray | 307/296 |
| 4,402,082 | 8/1983 | Cope | 371/22 |
| 5,120,909 | 6/1992 | Kutz et al. | 178/63 |
| 5,309,569 | 5/1994 | Warchol | 395/325 |
| 5,313,595 | 5/1994 | Lewis et al. | 395/325 |
| 5,323,291 | 6/1994 | Boyle et al. | 361/683 |
| 5,467,453 | 11/1995 | Kocis | 395/281 |

Primary Examiner—Jack B. Harvey
Assistant Examiner—Jigar Pancholi
Attorney, Agent, or Firm—Donald E. Scheiber

[57] ABSTRACT

A host adapter, having at least two connectors which both belong to a single digital computer bus, includes a first terminator that is coupled to a first portion of the digital computer bus, and a second terminator that is coupled to a second, separate portion of the bus. Upon being enabled by a control signal, these terminators respectively terminate the first and second portions of the bus. The host adapter also includes termination control logic coupled to the first and second terminators, and to connectors for the bus. The termination control logic receives connection signals from the connectors which indicate connection or non-connection of a device to the first portion, or to the combined first and second portions of the bus. The termination control logic processes these connection sensing signals and transmits two independent control signals which appropriately enable or disable the first and second terminators. The host adapter may also include a third connector that also belongs to the bus, and from which the termination control logic also receives connection sensing signals. In addition to providing control signals for the terminators, the termination control logic also detects and indicates if devices are improperly connected to the bus.

27 Claims, 3 Drawing Sheets

HOST ADAPTER PROVIDING AUTOMATIC TERMINATOR CONFIGURATION

BACKGROUND OF THE INVENTION

1. Field of the Invention

The present invention relates generally to computer bus signal line terminators, and, more particularly, to a signal line termination system for multi-connector host adapters which automatically detects devices coupled to the host adapters' several connectors, for valid device connections configures the host adapter for proper signal line termination, and for invalid device connections indicates an error.

2. Description of the Prior Art

A "bus" in a digital computer system is a circuit consisting of parallel conductors for interconnecting major components of a digital computer which transfers electric signals from one component connected to the bus to another component connected to the bus. Buses of various different types are present in virtually every digital computer. One particular bus, called the Small Computer System Interface ("SCSI") bus, is used widely for coupling to a digital computer various different peripheral devices, e.g. disk drives, Digital Audio Tape ("DAT") drives, Compact Disk Read Only Memory ("CD ROM") drives, optical storage drives, printers, scanners, and even photo-composers.

The SCSI bus is a local Input/Output ("I/O") bus that can be operated over a wide range of data rates. The primary object of the SCSI bus interface is to provide host computers with device independence within a class of devices. Accordingly, different disk drives, tape drives, printers, optical media drives, and other devices can be added to a host computer without requiring modifications to generic system hardware of software. Standards have been adopted which specify different types of SCSI buses, e.g. the SCSI-I and, SCSI-II standards. A key object of the SCSI-II standard is providing compatibility with those SCSI-I devices that support bus parity, and that conform to level 2 of the SCSI-1 standard. In practical terms such compatibility means many different SCSI-I devices operate properly if connected to a SCSI-II bus despite differences between the SCSI-I and SCSI-II standards.

The SCSI bus is a parallel, multimaster I/O bus which has been widely adopted for use in digital computer systems since the American National Standards Institute ("ANSI") approved the SCSI-I standard in 1986. A SCSI-I bus interconnects up to 8 logical units, i.e. host adapters or peripheral controllers, each unit can, in turn, have up to 8 logical subunits for a total of 64 logical subunits.

Electrically, SCSI bus signal lines connecting devices can be either single-ended, wherein each signal's logic level is determined in relationship to a common electrical ground, or differential, wherein each signal's logic level is determined between pairs of conductors without reference to a common electrical ground. A single-ended SCSI bus may be up to 18 feet long. Alternatively, a differential SCSI bus may be up to 75 feet long.

The SCSI-II standard, which evolved from the SCSI-I standard, makes numerous changes from the SCSI-I standard including establishment of a standard way for powering SCSI bus terminators, and 2 optional performance enhancements to increase the amount of data which can be transferred across a SCSI bus during an interval of time. These 2 optional performance enhancements are fast SCSI which permits up to 10,000,000 transfers across the bus per second, and "wide" SCSI which permits parallel transfer of either 16 or 32 bits at a time as an alternative to the SCSI-I limitation of transferring only 8 bits in parallel at any instant in time.

A device called a terminator must be connected to each end of a SCSI bus, regardless of whether it is a SCSI-1 bus or a SCSI-II bus, and regardless of whether it is a single-ended SCSI bus or a differential SCSI bus. Moreover, a SCSI bus can have only 2 such terminators. The SCSI bus will not function properly if there are more than 2 terminators, or if the terminators are not respectively located electrically at, or very close to, each end of the bus.

Even though in human terms signals move almost instantaneously over a SCSI bus, they do, in fact, travel at a measurable speed of approximately 1 nanosecond per foot along the SCSI bus. A SCSI bus includes terminators to absorb each successive SCSI bus signal as it arrives at the ends of the bus. By absorbing the signal, the terminator prevents the signal from reflecting (echoing) from that end of the bus to travel back along the bus and interfere with subsequent signals. If a SCSI bus is improperly terminated, i.e. either having too few or too many terminators or having the terminators installed at the wrong location, devices coupled to the bus may either malfunction, e.g. produce errors while operating, of may simply cease functioning.

Each SCSI bus device that includes its own separate enclosure includes 2 SCSI bus connectors, unless the device is specifically designed for connection at only the end of the SCSI bus. If such a 2 connector SCSI bus device connects to one end or the other of the bus, a SCSI bus cable connects to one or the other of these connectors. If the device has an internal terminator which generally can be enabled by a switch, usually located on the outside of the device's enclosure, nothing connects to the device's second connector. Conversely, if the device lacks an internal terminator, a SCSI bus terminator will be installed on the device's second connector. If a SCSI device having 2 connectors is installed anywhere along the length of the bus other than at an end of the bus, then different SCSI bus cables connect to each of the connectors. In this way, the SCSI bus electrically "daisy chains" through all the devices connected to the bus except those devices connected at one end or the other of the SCSI bus.

Figure 1A:
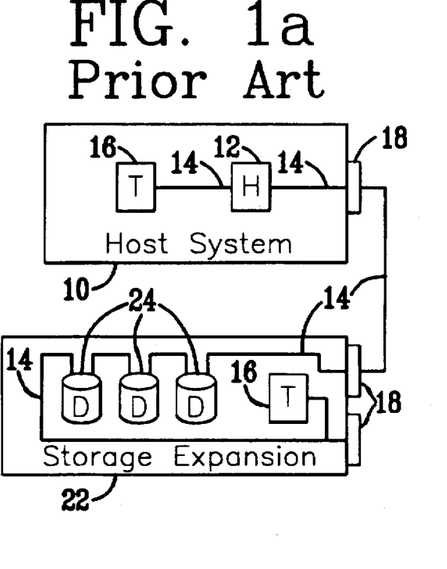
FIGS. 1a and 1b are block diagrams depicting prior art digital computer systems that include a host system and one or more storage expansions interconnected by a SCSI bus.

Referring now to FIG. 1a, depicted there is a digital computer host system 10 that includes a host adapter 12 ("H") that connects to one end of a SCSI bus 14. Because the host adapter 12 is located at one end of the SCSI bus 14, a terminator 16 ("T") also connects to the SCSI bus 14 within the host system 10. In the illustration of FIG. 1a, the SCSI bus 14 extends from a external SCSI connector 18, located on the host system 10, to a first external SCSI connector 18, located on a storage expansion 22. The storage expansion 22 encloses several disk drives 24 ("D") through which the SCSI bus 14 daisy chains until reaching a second external SCSI connector 18 of the storage expansion 22. Because the SCSI bus 14 ends at the second external SCSI connector 18 of the storage expansion 22, the storage expansion 22 includes the mandatory terminator 16 that connects to the SCSI bus 14 immediately adjacent to the second external SCSI connector 18.

U.S. Pat. No. 5,313,595 entitled "Automatic Signal Termination System For a Computer Bus," which issued May 17, 1994, on an application filed in the names of Mark S. Lewis and Ronald R. Ravey ("the Lewis et al. patent"), discloses an automatic termination system for an end terminated bus such as the SCSI bus. The Lewis et al. patent discloses a circuit, included in each device connected to the bus, which senses whether the bus daisy chains through it, or if there is only a single connection to the bus. If the circuit disclosed in that patent senses that the bus daisy chains through the device, then it electrically disables a terminator included in the device. Conversely, if the circuit senses that the bus does not daisy chain through the device, then it electrically enables the terminator.

Figure 1B:
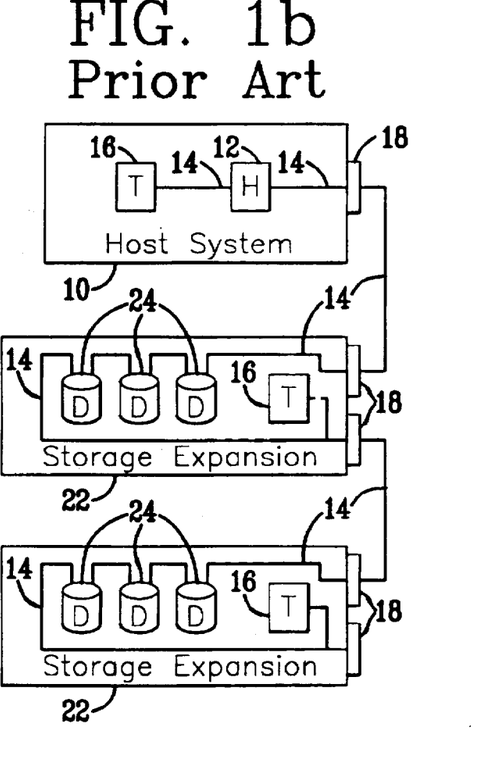

FIG. 1b depicts the host system 10 and storage expansion 22 of FIG. 1a with a second storage expansion 22 that connects to the SCSI bus 14 at the second external SCSI connector 18 of the first storage expansion 22. If the first storage expansion 22 includes a sensing circuit of the type disclosed in the Lewis et al. patent, then immediately upon connection of the second storage expansion 22 to the second external SCSI connector 18 of the first storage expansion 22, the sensing circuit automatically disables the terminator 16 included in the first storage expansion 22 (indicated by a dashed line in FIG. 1a) thus ensuring that terminators 16 connect only to the ends of the SCSI bus 14.

While SCSI bus devices that include the circuit disclosed in the Lewis et al. patent automatically ensure that SCSI bus terminators are always properly positioned at the ends of the bus, it fails to address a problem of SCSI bus termination that appears in host adapters. To provide host adapters capable of fully exploiting the range of device capabilities permitted by the SCSI-II standard, terminators in modern SCSI bus host adapters must be configurable to work properly when connected to devices designed for use with either the "narrow" SCSI-I bus, which transfers only 8 bits at any instant in time, or with the "wide" SCSI-II bus, which transfers 16 bits at each instant in time. Moreover, most host adapters also include at least 2 SCSI connectors, one for connecting to SCSI devices within the same enclosure as the host adapter, and another for connecting to SCSI devices residing in a separate enclosure. Consequently, the SCSI-II bus standard permits connecting wide SCSI devices to one of a host adapter's connectors and narrow SCSI devices to another connector of the host adapter. Moreover, even if a host adapter provides only wide SCSI bus connectors, SCSI bus cables are available which mate with the wide SCSI bus connector at one end, while the cable's other end mates with a narrow SCSI bus connector of a narrow SCSI bus device. Under any of these circumstances, the host adapter may be electrically located in the middle of a narrow SCSI-I bus while concurrently being located at one end of the additional signal lines of a wide SCSI-II bus. If this occurs, the SCSI bus host adapter must be capable of providing proper termination for that portion of the wide SCSI-II bus which exceeds the narrow SCSI-I bus.

While a host adapter having only two connectors must address the SCSI bus termination problem described in the preceding paragraph, a SCSI bus host adapter may, and frequently does, include more than 2 SCSI connectors to facilitate connecting to both narrow and wide SCSI bus cables. For example, the host adapter may include a wide SCSI-II connector for connecting to SCSI devices residing in an enclosure separate from that in which the host adapter resides, and a pair of connectors for connecting to SCSI devices located within the same enclosure as the host adapter. Because a SCSI bus must be terminated, and because a SCSI bus may have only 2 terminators; only 2 connectors of a host adapter having 3 or more connectors may be connected to devices only by 1 or by 2 connectors with any additional connectors remaining unused.

To permit configuring the terminators included in a host adapter properly for its location either at one end or intermediate the ends of a SCSI bus, and/or for concurrent operation both with narrow and with wide SCSI bus devices regardless of its location along the SCSI bus; host adapters frequently include switches or jumpers which, prior to operating the host adapter, must be adjusted to accommodate the actual configuration of SCSI devices included in a computer system. Since a host adapter manufacturer cannot adjust the adapter's switches or jumpers, that task must be left to the individual who configures, or re-configures, a digital computer system that includes a SCSI host adapter.

While the preceding description of SCSI buses and SCSI bus termination should be readily understood by those who design SCSI devices and SCSI host adapters, less experienced individuals do not generally comprehend the principles required for properly adjusting the switches or jumpers included in a host adapter. Moreover, the choice between singled ended and differential cabling for SCSI devices adds yet another complexity which must be addressed by someone configuring a digital computer system that includes a SCSI host adapter. The potential for confusion is increased by the fact that cables which visually appear identical may, in fact, be quite different electrically with one cable being useful only with a single-ended SCSI bus devices while the other cable being useful with either a single-ended or a differential SCSI bus devices.

The complexity of properly terminating a SCSI bus combined with the complexity of selecting and properly installing the right SCSI cable frequently causes great difficulty for individuals configuring, or re-configuring, digital computer systems that include a SCSI bus. Such difficulties can be particularly exasperating if an individual has purchased SCSI bus components by mail order, and/or if an individual, either one highly knowledgeable about digital computer buses or a novice, lacks suitable and comparatively expensive SCSI bus diagnostic equipment that might assist in resolving precisely why a digital computer that includes a SCSI bus fails to operate properly, or to operate at all.

SUMMARY OF THE INVENTION

An object of the present invention is to provide a multi-connector SCSI bus host adapter that automatically configures terminators included in the host adapter for all valid configurations of SCSI bus devices.

Another object of the present invention is to provide a multi-connector SCSI bus host adapter that automatically detects and signals the existence of invalid configurations of SCSI bus devices.

Another object of the present invention is to provide a multi-connector SCSI bus host adapter that facilitates incorporation into a digital computer system by one unskilled in configuring SCSI bus devices.

Another object of the present invention is to provide a SCSI bus host adapter which eliminates any necessity for disassembling a computer in order to change the configuration of SCSI bus devices connected thereto.

Yet another object of the present invention is to provide a host adapter having simple automatic termination for a multi-connector SCSI bus host adapter.

Yet another object of the present invention is to provide a host adapter having cost effective automatic termination for a multi-connector SCSI bus host adapter.

Yet another object of the present invention is to provide host adapter having automatic termination for a multi-connector SCSI bus host adapter that is easy and economical to manufacture.

Briefly the present invention in a preferred embodiment is a host adapter adapted for inclusion into a digital computer system. The host adapter that has at least two connectors, both connector belonging to a single digital computer bus. The host adapter also includes a first terminator that is coupled to a first portion of the digital computer bus, and a second terminator that is coupled to a second, separate portion of the digital computer bus. Upon being enabled, these terminators respectively terminate the first and second portions of the digital computer bus. Each terminator is responsive to a terminator control signal for enabling the terminator and for disabling the terminator.

The host adapter also includes termination control logic that is coupled to the first terminator, to the second terminator and to the bus connectors. The termination control logic receives a first connection sensing signal from each such connector which indicates connection or non-connection of a device to the first portion of the digital computer bus. The termination control logic also receives a second connection sensing signal from each such connector which indicates connection or non-connection of a device to the second portion of the digital computer bus. The termination control logic processes these connection sensing signals and transmits, in response to such connection sensing signals processing, two independent control signals respectively to the first terminator second terminator which enable or disable the corresponding terminator. In this way the host adapter automatically configures both the first terminator and the second terminator for properly terminating the digital computer bus for operation with all devices coupled to the connectors.

The host adapter may also include a third connector that also belongs to the digital computer bus. Under such circumstances, the termination control logic also receives from the third connector a connection sensing signal which indicates connection or non-connection of a device to the first portion of the digital computer bus. As for a host adapter having only two connectors, the termination control logic again processes the connection sensing signals from all three connectors to generate appropriate terminator enabling or disabling control signals.

In addition to providing control signals for enabling or disabling the terminators, in a preferred embodiment the termination control logic also detects and indicates if devices are improperly connected to the digital computer bus. The termination control logic also detects and indicates a faulty connection of a cable between a host adapter connector and a device. Upon detecting either of these conditions, the host adapter indicates an invalid or a faulty connection by activating a visible indicator included in the host adapter, or by providing digital data for processing by a computer program executed by a digital computer connected to the host adapter.

These and other features, objects and advantages will be understood or apparent to those of ordinary skill in the art from the following detailed description of the preferred embodiment as illustrated in the various drawing figures.

DETAILED DESCRIPTION OF THE PREFERRED EMBODIMENT

The following table lists the various signal lines included in a single-ended wide SCSI-II bus that is capable of concurrently transmitting 16 bits of data.

| Signal Name | Connector Contact Number | Connector Contact Number | Signal Name |
|---|---|---|---|
| GROUND | 1 | 35 | −DB(12) |
| GROUND | 2 | 36 | −DB(13) |
| GROUND | 3 | 37 | −DB(14) |
| GROUND | 4 | 38 | −DB(15) |
| GROUND | 5 | 39 | −DB(P1) |
| GROUND | 6 | 40 | −DB(0) |
| GROUND | 7 | 41 | −DB(1) |
| GROUND | 8 | 42 | −DB(2) |
| GROUND | 9 | 43 | −DB(3) |
| GROUND | 10 | 44 | −DB(4) |
| GROUND | 11 | 45 | −DB(5) |
| GROUND | 12 | 46 | −DB(6) |
| GROUND | 13 | 47 | −DB(7) |
| GROUND | 14 | 48 | −DB(P) |
| GROUND | 15 | 49 | GROUND |
| GROUND | 16 | 50 | GROUND |
| TERMPWR | 17 | 51 | TERMPWR |
| TERMPWR | 18 | 52 | TERMPWR |
| GROUND | 19 | 53 | RESERVED |
| GROUND | 20 | 54 | GROUND |
| GROUND | 21 | 55 | −ATN |
| GROUND | 22 | 56 | GROUND |
| GROUND | 23 | 57 | −BSY |
| GROUND | 24 | 58 | −ACK |
| GROUND | 25 | 59 | −RST |
| GROUND | 26 | 60 | −MSG |
| GROUND | 27 | 61 | −SEL |
| GROUND | 28 | 62 | −C/D |
| GROUND | 29 | 63 | −REQ |
| GROUND | 30 | 64 | −I/O |
| GROUND | 31 | 65 | −DB(8) |
| GROUND | 32 | 66 | −DB(9) |
| GROUND | 33 | 67 | −DB(10) |
| GROUND | 34 | 68 | −DB(11) |

As specified in the ANSI standard and as listed in the preceding table, the wide SCSI-II bus in effect includes two bidirectional data buses each with its own respective parity signal line (i.e. DB(0–7)+DB(P) and DB(8–15)+DB(P1)), lines carrying electrical power for bus terminators, ground lines, and a set of nine (9) control signal lines, some of which are bidirectional. The 9 control signal lines of the SCSI bus are a Busy ("-BSY") signal line, a Select ("-SEL") signal line, a Control/Data ("-C/D") signal line, an Input/Output ("-I/O") signal line, a Message ("-MSG") signal line, a Request ("-REQ") signal line, an Acknowledge ("-ACK") signal line, an Attention ("-ATN") signal line, and a Reset ("-RST") signal line.

It is readily apparent from the preceding table that connector contact numbers 7–30 and 41–64 together with the signals associated therewith constitute an entire narrow SCSI bus 14. Adding connector contact numbers 1–6, 31–34, 35–40 and 65–68 to the narrow SCSI bus 14 constitutes an entire wide SCSI bus 14.

Figure 2A:
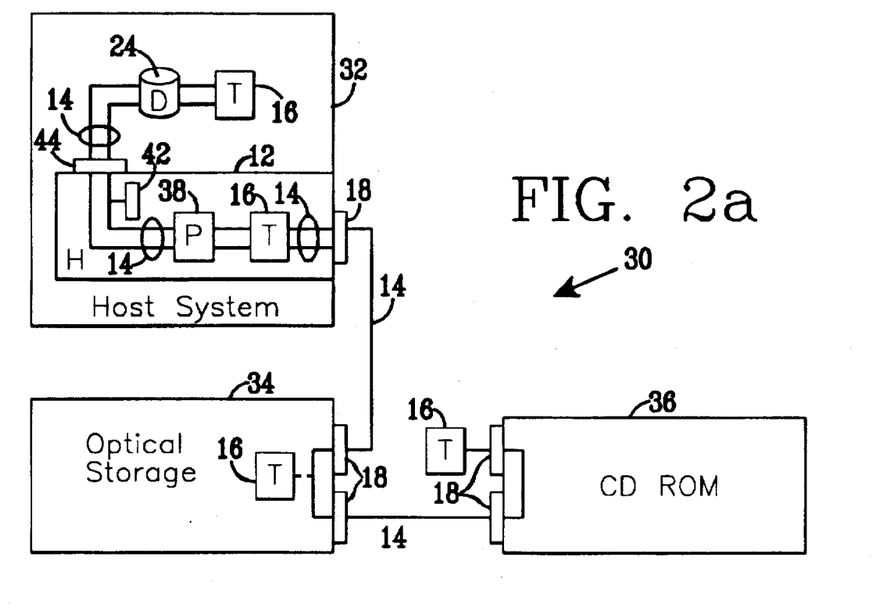
FIGS. 2a, 2b and 2c are block diagrams depicting alternative configurations for digital computer systems that include a host system, having a host adapter in accordance with the present invention, and various devices that interconnect with the host adapter by a SCSI bus.

FIG. 2a depicts a computer system, referred to by the general reference character 30, that, as illustrated in that FIG., exploits the full range of device capabilities permitted under the ANSI SCSI-II standard. The computer system 30 includes a digital computer host system 32 that is connected by the SCSI bus 14 first to an optical storage 34 and then to a CD ROM 36. In the illustration of FIG. 2a, the SCSI bus 14 originating at the external SCSI connector 18 of the host system 32, indicated by a single line, represents a narrow SCSI bus that daisy chains through the optical storage 34 and the CD ROM 36. While the optical storage 34 includes an internal terminator 16, as indicated by the broken line in FIG. 2a the terminator 16 included in the optical storage 34 is disabled because the narrow SCSI bus 14 daisy chains through the optical storage 34. In accordance with the ANSI SCSI standard, a terminator 16 connects to one of the external SCSI connectors 18 of the CD ROM 36 at one end of the narrow SCSI bus 14.

While the narrow SCSI bus 14 connecting to the optical storage 34 originates at the external SCSI connector 18, the host adapter 12 illustrated in FIG. 2a actually supplies a wide SCSI bus 14, depicted by double parallel lines, to the external SCSI connector 18. One of the parallel lines on the host adapter 12 represents the combined SCSI-II control signal lines together with the low order data lines DB(0–7)+DB(P), which thus combined constitute the narrow SCSI bus 14. The other parallel line of the SCSI bus 14 within the host adapter 12 indicates the high order data lines DB(8–15)+DB(P1), which, in combination with the narrow SCSI, bus constitute the wide SCSI bus 14. Within the host adapter 12, the wide SCSI bus 14 connects both to a terminator 16 and to a SCSI I/O Processor 38, which preferably is a NCR 53C825 PCI-SCSI I/O Processor manufactured by NCR Corporation of Dayton, Ohio. The host adapter 12 also includes an internal narrow internal SCSI connector 42 and an wide internal SCSI connector 44 appropriately connected to the SCSI bus 14.

In the computer system 30 depicted in FIG. 2a, the host system 32 includes, in addition to the host adapter 12, a disk drive 24 that connects to the wide internal SCSI connector 44. In accordance with the ANSI SCSI standard, a terminator 16 connects to one end of the wide SCSI bus 14 at the disk drive 24. Because the narrow SCSI bus 14 extending from the disk drive 24 through the host adapter 12 to the CD ROM 36 is properly terminated at both ends, that portion of the terminator 16 included in the host adapter 12 which connects to the narrow SCSI bus 14 must be disabled. However, properly terminating both ends of the high order data lines DB(8–15)+DB(P1) in the wide SCSI bus 14, extending only from the host adapter 12 to the disk drive 24, requires enabling a portion of the terminator 16 included in the host adapter 12.

Figure 2B:
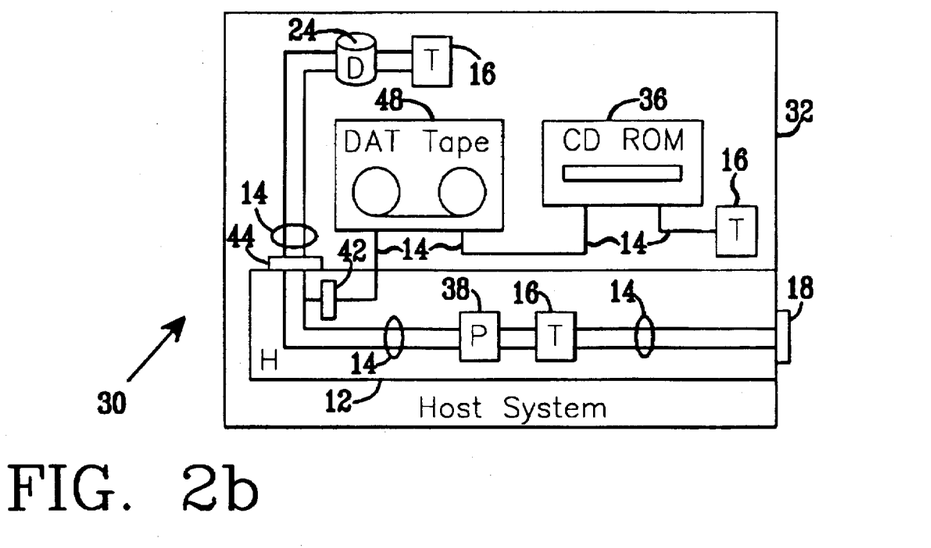
Figure 2C:
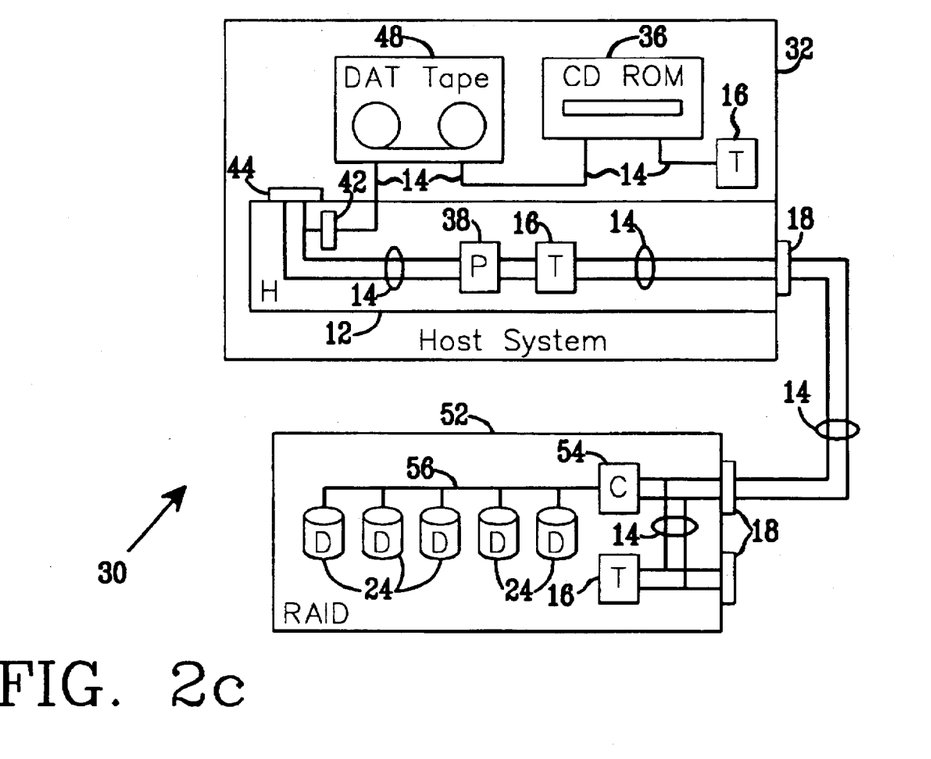

FIGS. 2b and 2c depict other possible configurations for the computer system 30 in which the host adapter 12 must provide a partial termination of only the wide portion of the SCSI bus 14. Similar to the host system 32 depicted in FIG. 2a, the host system 32 depicted in FIG. 2b includes a terminator 16 and a disk drive 24 that connect to the wide internal SCSI connector 44 by a wide SCSI bus 14. However, the host system 32 of FIG. 2b also includes an internal DAT drive 48 that connects by a narrow SCSI bus 14 to the narrow internal SCSI connector 42. In the illustration of FIG. 2b, the narrow SCSI bus 14 daisy chains through the DAT drive 48 to an internal CD ROM 36. A terminator 16 terminates the narrow SCSI bus 14 at the CD ROM 36. As with the host system 32 of FIG. 2a, the terminator 16 of the host adapter 12 depicted in FIG. 2b must terminate the high order data lines DB(8–15)+DB(P1) in the wide SCSI bus 14 extending only from the host adapter 12 to the disk drive 24. If the host system 32 depicted in FIG. 2b were to omit the DAT drive 48, the CD ROM 36 together with its associated terminator 16, and the SCSI bus 14 connected to the narrow internal SCSI connector 42, then the terminator 16 included in the host adapter 12 must provide termination for the entire wide SCSI bus 14.

The host system 32 depicted in FIG. 2c is identical to that depicted in FIG. 2b except it omits the wide SCSI bus 14, the disk drive 24 and its associated terminator 16. However, in addition to the host system 32, the computer system 30 depicted in FIG. 2c also includes a redundant array of inexpensive disks ("RAID") 52 that is coupled to the external SCSI connector 18 of the host system 32 by a wide SCSI bus 14. The RAID 52 includes a RAID controller 54 which connects to the wide SCSI bus 14 internally within the RAID 52 and a terminator 16 for the wide SCSI bus 14. The RAID 52 also includes several disk drives 24 which are coupled to the RAID controller 54 by a RAID bus 56. The RAID bus 56 may be selected from several different types of buses including an integrated drive electronics ("IDE") bus, an enhanced IDE bus, or even a SCSI bus. Since the RAID controller 54 electrically isolates the wide SCSI bus 14 from the RAID bus 56, the presence of the RAID bus 56 within the RAID 52 does not influence in any way the termination requirements for the wide SCSI bus 14.

While FIGS. 2a, 2b, and 2c all depict a computer system 30 in which the terminator 16 included in the host adapter 12 provides partial termination for the high order data lines DB(8–15)+DB(P1) in the wide SCSI bus 14, it is readily apparent that if the optical storage 34 and the CD ROM 36 were omitted from FIG. 2a and/or the CD ROM 36 and the DAT drive 48 were omitted from either FIG. 2b or 2c, the terminator 16 included in the host adapter 12 would have to provide termination for the entire wide SCSI bus 14. Similarly, it is readily apparent that if in FIG. 2a, instead of the optical storage 34 and the CD ROM 36 connecting to the external SCSI connector 18 of the host system 32, the RAID 52 depicted in FIG. 2c connected to the external SCSI connector 18 of the host system 32, in accordance with the ANSI SCSI standard all termination within the host adapter 12 must be disabled.

The preceding configuration alternatives are complicated even further because, similar to the external SCSI connector 18, a cable for either a wide or a narrow SCSI bus 14 may be plugged into the wide internal SCSI connector 44. Thus, valid configurations for the host adapter 12 include up to a pair of wide SCSI buses 14 plugged respectively into the connectors 18 and 44, a mixed pair of wide and narrow SCSI buses 14 plugged into any two of the connectors 18, 42 and 44, or a pair of narrow SCSI bus 14 plugged into any two of the connectors 18, 42 and 44.

With a conventional host adapter, depending upon the particular devices to be included in a computer system 30 which includes a SCSI bus an individual configuring the host adapter 12 must first deduce which terminator configuration is required from the three possibilities described above, i.e. full termination, partial termination for only the high order data lines DB(8–15)+DB(P1) in the wide SCSI bus 14, or no termination. After determining the appropriate terminator configuration, the individual must then set the proper switches or install the proper jumpers as required to accommodate the actual configuration of SCSI devices. If, for example, the individual were for the first time extending the SCSI bus 14 of an already operating computer system 30 from the external SCSI connector 18 either with a narrow or with a wide SCSI bus 14, the host system 32 must be opened to access the host adapter 12 to change switch or jumper settings. The same need to open the host system 32 also arises if an individual is re-configuring the host system 32 to change between a narrow SCSI bus 14 and a wide SCSI bus 14 connected to the external SCSI connector 18, or if the individual disconnects an existing SCSI bus 14 from the external SCSI connector 18.

In addition to the possibility of confusion that attends properly configuring a computer system 30 which includes a SCSI bus 14, there also exists the possibility of configuring the computer system 30 to violate the ANSI SCSI-II standard. For example, if an individual were to attempt to add either the optical storage 34 and the CD ROM 36 depicted in FIG. 2a or the RAID 52 depicted in FIG. 2c to the external SCSI connector 18 of the host system 32 depicted in FIG. 2b, that would establish a configuration that is not permitted under the ANSI SCSI-II standard. In such a configuration of the host system 32, even with the terminator 16 included in the host adapter 12 disabled, there would still exist an excessive number of terminators 16 connected to the narrow portion of the SCSI bus 14, and therefore the computer system 30 would not function reliably, if at all.

Figure 3:
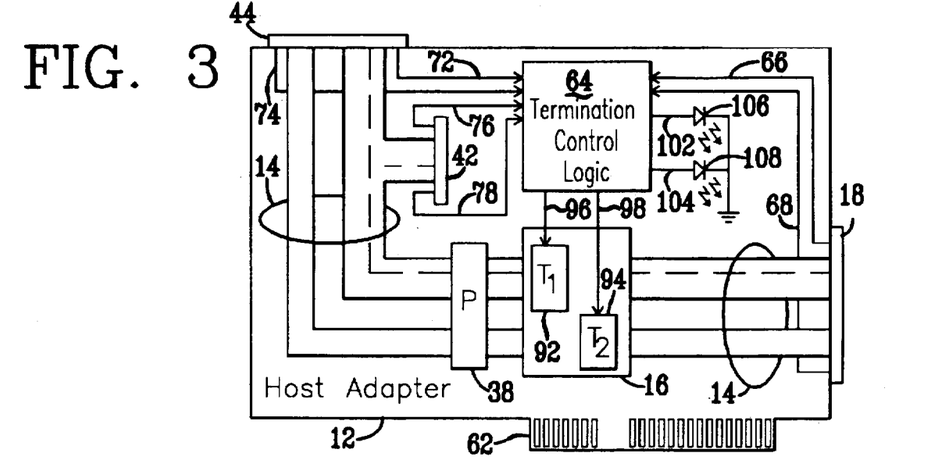
FIG. 3 is a block diagram depicting a host adapter in accordance with the present invention that includes a termination control logic for automatically configuring terminators included in the host adapter.

FIG. 3 depicts a block diagram of the host adapter 12 in accordance with the present invention which provides automatic terminator configuration. As depicted in FIG. 3, the host adapter 12 includes a connector 62 which engages and mates with a corresponding socket included in the host system 32 (not illustrated in any of the FIGS.). The connection between the connector 62 and the mating socket provides electrical power to the host adapter 12, and electrical signals passing between the connector 62 and the socket permit the an exchange of commands and data between the host adapter 12 and the remainder of the host system 32.

To provide automatic configuration of the terminator 16 included in the host adapter 12, the host adapter 12 includes termination control logic 64. The termination control logic 64 receives a pair of cable-connection signals from each of the connectors 18, 42 and 44. Accordingly, the termination control logic 64 receives a cable-connection signal from pin 1 of the external SCSI connector 18 via a wide external-connector ground-signal-pin-low signal line 66, and a cable-connection signal from pin 30 via a wide external-connector ground-signal-pin-high signal line 68. Correspondingly, the termination control logic 64 receives a cable-connection signal from pin 1 of the wide internal SCSI connector 44 via a wide internal-connector ground-signal-pin-low signal line 72, and a cable-connection signal from pin 30 via a wide internal-connector ground-signal-pin-high signal line 74. Finally, the termination control logic 64 receives a cable-connection signal from pin 1 of the narrow internal SCSI connector 42 via a narrow internal-connector ground-signal-pin-low signal line 76, and a cable-connection signal from pin 49 via a narrow internal-connector ground-signal-pin-high signal line 78.

Figure 4:
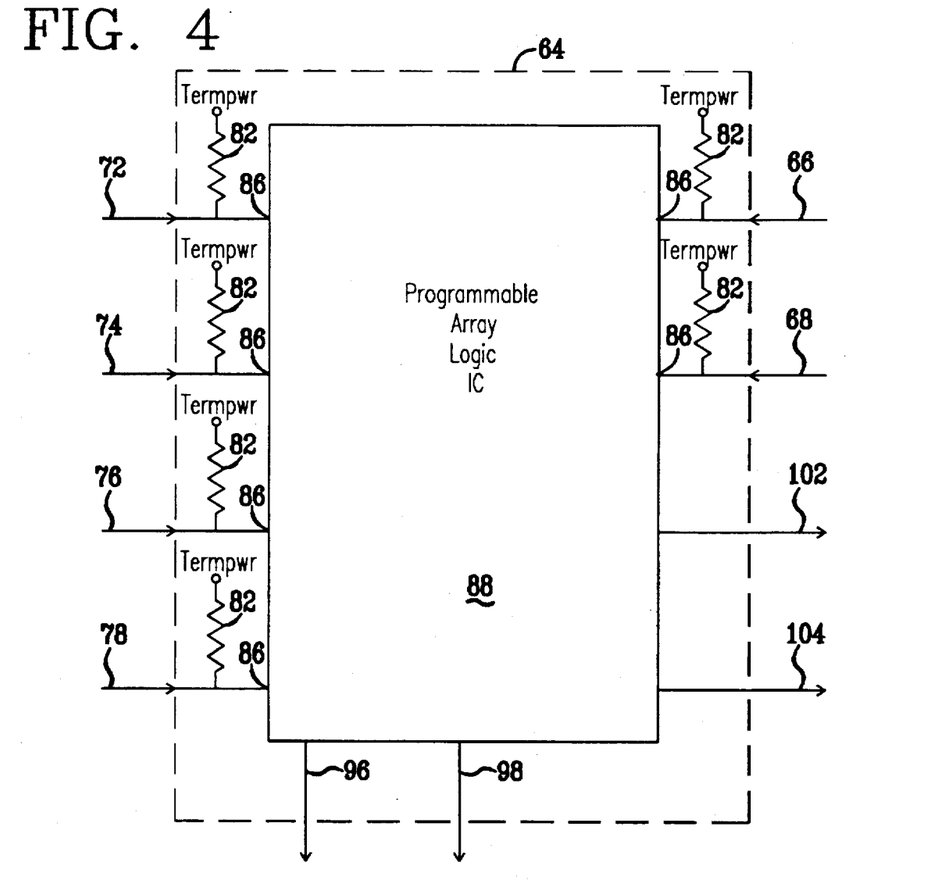
FIG. 4 is a block diagram depicting the termination control logic illustrated in FIG. 3.

As illustrated in FIG. 4, each of the signal lines 66, 68, 72, 74, 76 and 78 connects, within the termination control logic 64, to a resistor 82, the other end of which connects to the TERMPWR termination power lines included in the SCSI bus 14. Each of the signal lines 66, 68, 72, 74, 76 and 78 also connect to an input pin 86 of a programmable array logic ("PAL") integrated circuit ("IC") 88 included in the termination control logic 64.

As specified in the ANSI SCSI-II standard, each device connected to the SCSI bus 14 that is a SCSI initiator must supply the bus' TERMPWR lines with electrical power at 4.25 to 5.25 volts dc if it connects to a single ended SCSI bus 14, or at 4.0 to 5.25 volts dc if it connects to a differential SCSI bus 14. Consequently, if a ground line of a SCSI bus cable does not connect to a signal line 66, 68, 72, 74, 76 or 78, then the voltage on that signal line present at the corresponding input pin 86 of the PAL IC 88 equals the TERMPWR voltage. Conversely, if a ground line of a SCSI bus cable connects to a signal line 66, 68, 72, 74, 76 or 78, then the voltage on that signal line present at the corresponding input pin 86 of the PAL IC 88 equals ground potential.

The PAL IC 88 is programmed to provide a digital logic circuit which processes the 6 signals received on the signal lines 66, 68, 72, 74, 76 and 78 to control 2 separate terminator ICs 92 and 94 included in the terminator 16. The first terminator IC 92, which preferably consists of a pair of MLC509CS Active SCSI Terminator ICs manufactured by Micro Linear of San Jose, Calif., when enabled by a control signal transmitted from the PAL IC 88 via a low-terminator-enable control-signal line 96 terminates the combined control signal lines of the SCSI bus 14 together with the low order data lines DB(0–7)+DB(P) which in combination make up the narrow SCSI bus 14. The second terminator IC 94, which preferably consists of a single MLC509CS Active SCSI Terminator, when enabled by a control signal transmitted from the PAL IC 88 via a high-terminator-enable control-signal line 98 terminates the high order data lines DB(8–15)+DB(P1) of the wide SCSI bus 14.

Set forth below is data supplied as input to an ABEL computer program. The following data specifies a digital logic to be implemented by the PAL IC 88 for processing the cable-connect signals present on the lines 66, 68, 72, 74, 76 and 78. The ABLE computer program processes the following input data to produce a JEDEC format output file. The JEDEC format output file is then transferred to a PROM writer which "burns" the logic design specified by the following input data into the PAL IC 88. As specified in the following input data, the PAL IC 88 is preferably a P16V8C IC. In the following input data, the signal mnemonic:

WL1 corresponds to the connect signal present on wide external-connector ground-signal-pin-low signal line 66;

WH1 corresponds to the connect signal present on wide external-connector ground-signal-pin-high signal line 68;

WL2 corresponds to the connect signal present on wide internal-connector ground-signal-pin-low signal line 72;

WH2 corresponds to the connect signal present on wide internal-connector ground-signal-pin-high signal line 74;

NL1 corresponds to the connect signal present on narrow internal-connector ground-signal-pin-low signal line 76; and NH1 corresponds to the connect signal present on narrow internal-connector ground-signal-pin-high signal line 78.

```
Module      term
Title 'Auto termination logic
Bob Rosenbloom 6/14/95'
    term device 'P16V8C';
    WL1,WH1,WL2,WH2,NL1,NH1      pin 1,2,3,4,5,6;
    ENL,ENH,CERR,TOMANY          pin 18,17,16,15;
    H,L,Z,X,C       = 1, 0, .Z., .X., .C.;
    combo   = [WL1,WH1,WL2,WH2,NL1,NH1];
Equations
"WC1,WC1,WC2,WC2,NC,NC,Low Terminator,High
Terminator,Cabling,Too Many
"GSPL,GSPH,GSPL,GSPH,GSPL,GSPH
```

-continued

```
Enable,Enable,Error,Drives
@dcset
truth_table ([WL1,WH1,WL2,WH2,NL1,NH1] -->
          [ENL,ENH,CERR,TOMANY])
          [0,0,0,0,0,0]   -->  [0, 0, 0, 1 ];
          [0,0,0,0,0,1]   -->  [0, 0, 1, 1 ];
          [0,0,0,0,1,0]   -->  [0, 0, 0, 0 ];
          [0,0,0,0,1,1]   -->  [0, 0, 0, 0 ];
          [0,0,0,1,0,0]   -->  [0, 1, 1, 0 ];
          [0,0,0,1,0,1]   -->  [1, 1, 1, 0 ];
          [0,0,0,1,1,0]   -->  [1, 1, 1, 0 ];
          [0,0,0,1,1,1]   -->  [1, 1, 1, 0 ];
          [0,0,1,0,0,0]   -->  [0, 0, 0, 1 ];
          [0,0,1,0,0,1]   -->  [0, 1, 1, 0 ];
          [0,0,1,0,1,0]   -->  [0, 1, 1, 0 ];
          [0,0,1,0,1,1]   -->  [0, 1, 0, 0 ];
          [0,0,1,1,0,0]   -->  [0, 1, 0, 0 ];
          [0,0,1,1,0,1]   -->  [1, 1, 1, 0 ];
          [0,0,1,1,1,0]   -->  [1, 1, 1, 0 ];
          [0,0,1,1,1,1]   -->  [1, 1, 0, 0 ];
          [0,1,0,0,0,0]   -->  [0, 0, 0, 1 ];
          [0,1,0,0,0,1]   -->  [0, 1, 1, 0 ];
          [0,1,0,0,1,0]   -->  [0, 1, 1, 0 ];
          [0,1,0,0,1,1]   -->  [0, 1, 0, 0 ];
          [0,1,0,1,0,0]   -->  [0, 1, 0, 0 ];
          [0,1,0,1,0,1]   -->  [0, 1, 1, 0 ];
          [0,1,0,1,1,0]   -->  [0, 1, 1, 0 ];
          [0,1,0,1,1,1]   -->  [1, 1, 0, 0 ];
          [0,1,1,0,0,0]   -->  [0, 1, 0, 1 ];
          [0,1,1,0,0,1]   -->  [0, 1, 1, 0 ];
          [0,1,1,0,1,0]   -->  [0, 1, 1, 0 ];
          [0,1,1,0,1,1]   -->  [0, 1, 0, 0 ];
          [0,1,1,1,0,0]   -->  [0, 1, 0, 0 ];
          [0,1,1,1,0,1]   -->  [1, 1, 1, 0 ];
          [0,1,1,1,1,0]   -->  [1, 1, 1, 0 ];
          [0,1,1,1,1,1]   -->  [1, 1, 0, 0 ];
          [1,0,0,0,0,1]   -->  [1, 1, 1, 0 ];
          [1,0,0,0,1,0]   -->  [1, 1, 1, 0 ];
          [1,0,0,0,1,1]   -->  [1, 1, 0, 0 ];
          [1,0,0,1,0,0]   -->  [1, 1, 0, 0 ];
          [1,0,0,1,0,1]   -->  [1, 1, 1, 0 ];
          [1,0,0,1,1,0]   -->  [1, 1, 1, 0 ];
          [1,0,0,1,1,1]   -->  [1, 1, 0, 0 ];
          [1,0,1,0,0,0]   -->  [0, 1, 0, 0 ];
          [1,0,1,0,0,1]   -->  [1, 1, 1, 0 ];
          [1,0,1,0,1,0]   -->  [1, 1, 1, 0 ];
          [1,0,1,0,1,1]   -->  [1, 1, 0, 0 ];
          [1,0,1,1,0,0]   -->  [1, 1, 0, 0 ];
          [1,0,1,1,0,1]   -->  [1, 1, 1, 0 ];
          [1,0,1,1,1,0]   -->  [1, 1, 1, 0 ];
          [1,0,1,1,1,1]   -->  [1, 1, 0, 0 ];
          [1,1,0,0,0,0]   -->  [0, 1, 0, 1 ];
          [1,1,0,0,0,1]   -->  [1, 1, 1, 0 ];
          [1,1,0,0,1,0]   -->  [1, 1, 1, 0 ];
          [1,1,0,0,1,1]   -->  [1, 1, 0, 0 ];
          [1,1,0,1,0,0]   -->  [1, 1, 0, 0 ];
          [1,1,0,1,0,1]   -->  [1, 1, 1, 0 ];
          [1,1,0,1,1,0]   -->  [1, 1, 1, 0 ];
          [1,1,0,1,1,1]   -->  [1, 1, 0, 0 ];
          [1,1,1,0,0,0]   -->  [0, 1, 0, 0 ];
          [1,1,1,0,0,1]   -->  [1, 1, 1, 0 ];
          [1,1,1,0,1,0]   -->  [1, 1, 1, 0 ];
          [1,1,1,0,1,1]   -->  [1, 1, 0, 0 ];
          [1,1,1,1,0,0]   -->  [1, 1, 0, 0 ];
          [1,1,1,1,0,1]   -->  [1, 1, 1, 0 ];
          [1,1,1,1,1,0]   -->  [1, 1, 1, 0 ];
          [1,1,1,1,1,1]   -->  [1, 1, 0, 0 ];
test_vectors ([WL1,WH1,WL2,WH2,NL1,NH1] --> [ENL,ENH,CERR,TOMANY])
          [0,0,0,0,0,0]   -->  [0, 0, 0, 1 ];
          [0,0,0,0,0,1]   -->  [0, 0, 1, 1 ];
          [0,0,0,0,1,0]   -->  [0, 0, 0, 0 ];
          [0,0,0,0,1,1]   -->  [0, 0, 0, 0 ];
          [0,0,0,1,0,0]   -->  [0, 1, 1, 0 ];
          [0,0,0,1,0,1]   -->  [1, 1, 1, 0 ];
          [0,0,0,1,1,0]   -->  [1, 1, 1, 0 ];
          [0,0,0,1,1,1]   -->  [1, 1, 1, 0 ];
          [0,0,1,0,0,0]   -->  [0, 0, 0, 1 ];
          [0,0,1,0,0,1]   -->  [0, 1, 1, 0 ];
          [0,0,1,0,1,0]   -->  [0, 1, 1, 0 ];
          [0,0,1,0,1,1]   -->  [0, 1, 0, 0 ];
```

-continued

```
[0,0,1,1,0,0]  —>  [0, 1, 0, 0 ];
[0,0,1,1,0,1]  —>  [1, 1, 1, 0 ];
[0,0,1,1,1,0]  —>  [1, 1, 1, 0 ];
[0,0,1,1,1,1]  —>  [1, 1, 0, 0 ];
[0,1,0,0,0,0]  —>  [0, 0, 0, 1 ];
[0,1,0,0,0,1]  —>  [0, 1, 1, 0 ];
[0,1,0,0,1,0]  —>  [0, 1, 1, 0 ];
[0,1,0,0,1,1]  —>  [0, 1, 0, 0 ];
[0,1,0,1,0,0]  —>  [0, 1, 0, 0 ];
[0,1,0,1,0,1]  —>  [0, 1, 1, 0 ];
[0,1,0,1,1,0]  —>  [0, 1, 1, 0 ];
[0,1,0,1,1,1]  —>  [1, 1, 0, 0 ];
[0,1,1,0,0,0]  —>  [0, 1, 0, 1 ];
[0,1,1,0,0,1]  —>  [0, 1, 1, 0 ];
[0,1,1,0,1,0]  —>  [0, 1, 1, 0 ];
[0,1,1,0,1,1]  —>  [0, 1, 0, 0 ];
[0,1,1,1,0,0]  —>  [0, 1, 0, 0 ];
[0,1,1,1,0,1]  —>  [1, 1, 1, 0 ];
[0,1,1,1,1,0]  —>  [1, 1, 1, 0 ];
[0,1,1,1,1,1]  —>  [1, 1, 0, 0 ];
[1,0,0,0,0,1]  —>  [1, 1, 1, 0 ];
[1,0,0,0,1,0]  —>  [1, 1, 1, 0 ];
[1,0,0,0,1,1]  —>  [1, 1, 0, 0 ];
[1,0,0,1,0,0]  —>  [1, 1, 0, 0 ];
[1,0,0,1,0,1]  —>  [1, 1, 1, 0 ];
[1,0,0,1,1,0]  —>  [1, 1, 1, 0 ];
[1,0,0,1,1,1]  —>  [1, 1, 0, 0 ];
[1,0,1,0,0,0]  —>  [0, 1, 0, 0 ];
[1,0,1,0,0,1]  —>  [1, 1, 1, 0 ];
[1,0,1,0,1,0]  —>  [1, 1, 1, 0 ];
[1,0,1,0,1,1]  —>  [1, 1, 0, 0 ];
[1,0,1,1,0,0]  —>  [1, 1, 0, 0 ];
[1,0,1,1,0,1]  —>  [1, 1, 1, 0 ];
[1,0,1,1,1,0]  —>  [1, 1, 1, 0 ];
[1,0,1,1,1,1]  —>  [1, 1, 0, 0 ];
[1,1,0,0,0,0]  —>  [0, 1, 0, 1 ];
[1,1,0,0,0,1]  —>  [1, 1, 1, 0 ];
[1,1,0,0,1,0]  —>  [1, 1, 1, 0 ];
[1,1,0,0,1,1]  —>  [1, 1, 0, 0 ];
[1,1,0,1,0,0]  —>  [1, 1, 0, 0 ];
[1,1,0,1,0,1]  —>  [1, 1, 1, 0 ];
[1,1,0,1,1,0]  —>  [1, 1, 1, 0 ];
[1,1,0,1,1,1]  —>  [1, 1, 0, 0 ];
[1,1,1,0,0,0]  —>  [0, 1, 0, 0 ];
[1,1,1,0,0,1]  —>  [1, 1, 1, 0 ];
[1,1,1,0,1,0]  —>  [1, 1, 1, 0 ];
[1,1,1,0,1,1]  —>  [1, 1, 0, 0 ];
[1,1,1,1,0,0]  —>  [1, 1, 0, 0 ];
[1,1,1,1,0,1]  —>  [1, 1, 1, 0 ];
[1,1,1,1,1,0]  —>  [1, 1, 1, 0 ];
[1,1,1,1,1,1]  —>  [1, 1, 0, 0 ];
end
```

In addition to producing the output signals transmitted from the PAL IC 88 to the first terminator IC 92 and second terminator IC 94 respectively via the low-terminator-enable control-signal line 96 and high-terminator-enable control-signal line 98, the PAL IC 88 also transmits output signals via a too-many-cables error-signal line 102, and a improper-cabling error-signal line 104. In the embodiment of the host adapter 12 depicted in FIG. 3, the output signal from the PAL IC 88 present on the too-many-cables error-signal line 102 is supplied to a light emitting diode ("LED") 106, and the output signal present on the improper-cabling error-signal line 104 is supplied to a LED 108. If a SCSI bus cabling error occurs, then the signals present on the lines 102 and 104 illuminate one or the other of the LEDs 106 or 108 to provide a visual indication of the error. Alternatively, the signals present on the too-many-cables error-signal line 102 and on the improper-cabling error-signal line 104 can be provided, via the connector 62, to the remainder of the host system 32 for presentation in an error message on a display included in the host system 32.

If the LED 106 is illuminated, then there are too many SCSI bus cables and devices connected to the host adapter 12, i.e. SCSI bus devices are connected to all three connectors 18, 42 and 44 of the host adapter 12. If the LED 108 is illuminated, then the mechanical connection of a narrow cable to the narrow internal SCSI connector 42 is improper. The PAL IC 88 is able to determine that the cable connected to the narrow internal SCSI connector 42 is improper because the PAL IC 88 receives cable-connection signals from both physical ends of the narrow internal SCSI connector 42. Thus, if the PAL IC 88 receives only one of these cable connection signals instead of two, then the digital logic circuit implemented in the PAL IC 88 indicates that an improper cabling condition exists for the narrow internal SCSI connector 42. Supplying additional cable-connection signals to the PAL IC 88 from pins, such as pins 14 and 21, located near the middle of the wide SCSI connectors 18 and 44 permits the PAL IC 88 to also indicate the existence of an improper cabling condition for either of those two connectors.

Although the present invention has been described in terms of the presently preferred embodiment, it is to be understood that such disclosure is purely illustrative and is not to be interpreted as limiting. For example, while a P16V8C is the preferred PAL IC 88, other types of PALs may be used in the termination control logic 64. While the invention has been described with respect to current narrow and wide SCSI buses 14, it may be readily adapted for use with parallel, multimaster I/O buses of varying widths that require end termination. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A host adapter adapted for inclusion into a digital computer system, the host adapter comprising:

at least two connectors, each such connector belonging to a digital computer bus;

a first terminator coupled to a first portion of the digital computer bus for electrically terminating the first portion of the digital computer bus, said first terminator being responsive to a first terminator control signal for enabling said first terminator and for disabling said first terminator;

a second terminator coupled to a second portion of the digital computer bus, that is separate from the first portion of the digital computer bus, for electrically terminating the second portion of the digital computer bus; said second terminator being responsive to a second terminator control signal for enabling said second terminator and for disabling said second terminator;

termination control logic coupled to said first terminator, to said second terminator and to said connectors:

for receiving a first connection sensing signal from each such connector which indicates connection or non-connection of a device to the first portion of the digital computer bus;

for receiving a second connection sensing signal from each such connector which indicates connection or non-connection of a device to the second portion of the digital computer bus;

for processing the two first connection sensing signals received respectively from each of said connectors, and the two second connection sensing signals received respectively from each of said connectors; and for transmitting, in response to such connection sensing signals processing, both the first terminator control signal to said first terminator to enable or disable said first terminator, and the second terminator control signal to said second terminator to enable or disable said second terminator, whereby the host adapter automatically configures both said first terminator and said second terminator for properly terminating the digital computer bus for operation with all devices coupled to said connectors.

2. The host adapter of claim 1 wherein the digital computer bus includes only the first portion and the second portion.

3. The host adapter of claim 1 further comprising a third connector that also belongs to the digital computer bus, said termination control logic receiving from said third connector a first connection sensing signal which indicates connection or non-connection of a device to the first portion of the digital computer bus, said termination control logic processing the connection sensing signals from all three connectors, and transmitting, in response to such connection sensing signals processing, both the first terminator control signal to said first terminator to enable or disable said first terminator, and the second terminator control signal to said second terminator to enable or disable said second terminator.

4. The host adapter of claim 3 wherein said termination control logic further detects and indicates if devices are invalidly connected to the digital computer bus.

5. The host adapter of claim 4 wherein said termination control logic indicates an invalid connection of devices to the digital computer bus by activating a visible indicator included in the host adapter.

6. The host adapter of claim 4 wherein said termination control logic indicates an invalid connection of devices to the digital computer bus by providing digital data for processing by a computer program executed by a digital computer that is connected to the host adapter.

7. The host adapter of claim 1 wherein said termination control logic further detects and indicates detection of a faulty connection of a cable between a host adapter connector and a device.

8. The host adapter of claim 7 wherein said termination control logic indicates a faulty connection of a cable by activating a visible indicator included in the host adapter.

9. The host adapter of claim 7 wherein said termination control logic indicates a faulty connection of a cable by providing digital data for processing by a computer program executed by a digital computer that is connected to the host adapter.

10. A computer system comprising:

a device;

a digital computer bus to which said device connects; and a digital computer host system including a host adapter having at least two connectors that belong to the digital computer bus, the host adapter including:

at least two connectors, each such connector belonging to a digital computer bus;

a first terminator coupled to a first portion of the digital computer bus for electrically terminating the first portion of the digital computer bus, said first terminator being responsive to a first terminator control signal for enabling said first terminator and for disabling said first terminator;

a second terminator coupled to a second portion of the digital computer bus, that is separate from the first portion of the digital computer bus, for electrically terminating the second portion of the digital computer bus; said second terminator being responsive to a second terminator control signal for enabling said second terminator and for disabling said second terminator;

termination control logic coupled to said first terminator, to said second terminator and to said connectors:

for receiving a first connection sensing signal from each such connector which indicates connection or non-connection of a device to the first portion of the digital computer bus;

for receiving a second connection sensing signal from each such connector which indicates connection or non-connection of a device to the second portion of the digital computer bus;

for processing the two first connection sensing signals received respectively from each of said connectors, and the two second connection sensing signals received respectively from each of said connectors; and for transmitting, in response to such connection sensing signals processing, both the first terminator control signal to said first terminator to enable or disable said first terminator, and the second terminator control signal to said second terminator to enable or disable said second terminator, whereby the host adapter automatically configures both said first terminator and said second terminator for properly terminating the digital computer bus for operation with all devices coupled to said connectors.

11. The host adapter of claim 10 wherein the digital computer bus includes only the first portion and the second portion.

12. The host adapter of claim 10 further comprising a third connector that also belongs to the digital computer bus, said termination control logic receiving from said third connector a first connection sensing signal which indicates connection or non-connection of a device to the first portion of the digital computer bus, said termination control logic processing the connection sensing signals from all three connectors, and transmitting, in response to such connection sensing signals processing, both the first terminator control signal to said first terminator to enable or disable said first terminator, and the second terminator control signal to said second terminator to enable or disable said second terminator.

13. The host adapter of claim 12 wherein said termination control logic further detects and indicates if devices are invalidly connected to the digital computer bus.

14. The host adapter of claim 13 wherein said termination control logic indicates an invalid connection of devices to the digital computer bus by activating a visible indicator included in the host adapter.

15. The host adapter of claim 13 wherein said termination control logic indicates an invalid connection of devices to the digital computer bus by providing digital data for processing by a computer program executed by a digital computer that is connected to the host adapter.

16. The host adapter of claim 10 wherein said termination control logic further detects and indicates detection of a faulty connection of a cable between a host adapter connector and a device.

17. The host adapter of claim 16 wherein said termination control logic indicates a faulty connection of a cable by activating a visible indicator included in the host adapter.

18. The host adapter of claim 16 wherein said termination control logic indicates a faulty connection of a cable by providing digital data for processing by a computer program executed by a digital computer that is connected to the host adapter.

19. An automatic partial termination system for a digital computer bus comprising:

at least two connectors, each such connector belonging to a digital computer bus;

a first terminator coupled to a first portion of the digital computer bus for electrically terminating the first portion of the digital computer bus, said first terminator being responsive to a first terminator control signal for enabling said first terminator and for disabling said first terminator;

a second terminator coupled to a second portion of the digital computer bus, that is separate from the first portion of the digital computer bus, for electrically terminating the second portion of the digital computer bus; said second terminator being responsive to a second terminator control signal for enabling said second terminator and for disabling said second terminator;

termination control logic coupled to said first terminator, to said second terminator and to said connectors:

for receiving a first connection sensing signal from each such connector which indicates connection or non-connection of a device to the first portion of the digital computer bus;

for receiving a second connection sensing signal from each such connector which indicates connection or non-connection of a device to the second portion of the digital computer bus;

for processing the two first connection sensing signals received respectively from each of said connectors, and the two second connection sensing signals received respectively from each of said connectors; and for transmitting, in response to such connection sensing signals processing, both the first terminator control signal to said first terminator to enable or disable said first terminator, and the second terminator control signal to said second terminator to enable or disable said second terminator, whereby the automatic partial termination system automatically configures both said first terminator and said second terminator for properly terminating the digital computer bus for operation with all devices coupled to said connectors.

20. The automatic partial termination system of claim 19 wherein the digital computer bus includes only the first portion and the second portion.

21. The automatic partial termination system of claim 19 further comprising a third connector that also belongs to the digital computer bus, said termination control logic receiving from said third connector a first connection sensing signal which indicates connection or non-connection of a device to the first portion of the digital computer bus, said termination control logic processing the connection sensing signals from all three connectors, and transmitting, in response to such connection sensing signals processing, both the first terminator control signal to said first terminator to enable or disable said first terminator, and the second terminator control signal to said second terminator to enable or disable said second terminator.

22. The automatic partial termination system of claim 21 wherein said termination control logic further detects and indicates if devices are invalidly connected to the digital computer bus.

23. The automatic partial termination system of claim 22 wherein said termination control logic indicates an invalid connection of devices to the digital computer bus by activating a visible indicator included in the automatic partial termination system.

24. The automatic partial termination system of claim 22 wherein said termination control logic indicates an invalid connection of devices to the digital computer bus by providing digital data for processing by a computer program executed by a digital computer that is connected to the automatic partial termination system.

25. The automatic partial termination system of claim 19 wherein said termination control logic further detects and indicates detection of a faulty connection of a cable between a automatic partial termination system connector and a device.

26. The automatic partial termination system of claim 25 wherein said termination control logic indicates a faulty connection of a cable by activating a visible indicator included in the automatic partial termination system.

27. The automatic partial termination system of claim 25 wherein said termination control logic indicates a faulty connection of a cable by providing digital data for processing by a computer program executed by a digital computer that is connected to the automatic partial termination system.

* * * * *